(12) United States Patent
Reynolds (10) Patent No.: US 12,361,114 B2
(45) Date of Patent: Jul. 15, 2025

(54) SYSTEM AND METHOD FOR PROVIDING SECURITY TO LEGACY DEVICES

(71) Applicant: Honeywell International Inc., Charlotte, NC (US)

(72) Inventor: Brian R. Reynolds, Penn Valley, PA (US)

(73) Assignee: Honeywell International Inc., Charlotte, NC (US)

( * ) Notice: Subject to any disclaimer, the term of this patent is extended or adjusted under 35 U.S.C. 154(b) by 231 days.

(21) Appl. No.: 17/944,473

(22) Filed: Sep. 14, 2022

(65) Prior Publication Data

US 2023/0306100 A1 Sep. 28, 2023

Related U.S. Application Data

(60) Provisional application No. 63/323,356, filed on Mar. 24, 2022.

(51) Int. Cl.
*G06F 21/44* (2013.01)
*G06F 21/57* (2013.01)

(52) U.S. Cl.
CPC ............ *G06F 21/44* (2013.01); *G06F 21/572* (2013.01); *G06F 2221/034* (2013.01)

(58) Field of Classification Search
CPC ................................ G06F 21/44; G06F 21/572
See application file for complete search history.

(56) References Cited

U.S. PATENT DOCUMENTS

| | | | | |
|---|---|---|---|---|
| 10,275,962 B2* | 4/2019 | Britt | ..................... | H04W 12/041 |
| 2016/0134586 A1* | 5/2016 | Oosawa | .............. | H04L 61/5007 |
| | | | | 709/245 |
| 2016/0365680 A1* | 12/2016 | Gurram | ................. | H03K 17/964 |
| 2017/0078265 A1* | 3/2017 | Sundaresh | .............. | G06F 21/45 |
| 2017/0357439 A1* | 12/2017 | Lemay | ..................... | H04M 1/67 |
| 2018/0224819 A1 | 8/2018 | Noboa | | |
| 2019/0171820 A1* | 6/2019 | Chen | ...................... | G06F 21/575 |
| 2019/0272366 A1* | 9/2019 | Mayes | ..................... | G06F 21/40 |
| 2021/0400469 A1* | 12/2021 | Seremet | ................... | G07C 9/28 |
| 2023/0057860 A1* | 2/2023 | Yew | ..................... | H04L 63/0876 |
| 2023/0306100 A1* | 9/2023 | Reynolds | ................. | G06F 8/60 |

FOREIGN PATENT DOCUMENTS

| | | |
|---|---|---|
| EP | 2273746 A1 | 12/2011 |
| EP | 4141724 A1 | 3/2023 |
| KR | 20210073714 A | 6/2021 |

OTHER PUBLICATIONS

European Search Report for corresponding EP Application No. 23160291.3, Aug. 22, 2023.

* cited by examiner

*Primary Examiner* — Harris C Wang
(74) *Attorney, Agent, or Firm* — Paschall & Associates, LLC; James C. Paschall; Anthony Miologos (57) ABSTRACT

A system and method for securing a device of an industrial process control and automation system comprises setting a lock code in a device index of the device and executing a monitoring software program that reads the lock code and sets the device in a locked state. An enforcement software program prevents changes to the configuration and firmware of the device when the device is in the locked state. The device is further arranged to be released from the lock state by setting an unlock code in the device index and executing the monitoring software program to read the unlock code and set the device in an unlocked state.

20 Claims, 8 Drawing Sheets

SYSTEM AND METHOD FOR PROVIDING SECURITY TO LEGACY DEVICES

CROSS-REFERENCE TO RELATED APPLICATIONS

This application claims priority under 35 U.S.C. § 119(e) to U.S. Provisional Patent Application No. 63/323,356 filed on Mar. 24, 2022. This provisional application is hereby incorporated by reference in its entirety.

TECHNICAL FIELD

This disclosure is generally directed to industrial control and automation systems. More specifically, this disclosure relates to a system and method for securing and preventing changes to the configuration and firmware of legacy devices of an industrial process control and automation system.

BACKGROUND

Legacy process and safety controllers, gateways, and IO modules used in industrial process control and automation systems have been deployed with older hardware technology that do not have the latest cyber security protections such as for example secure boot, signed firmware, and download verification. These legacy devices and the system platforms supporting these devise also may not have the processing power to provide secure, encrypted, and authenticated communications. The legacy devices rely heavily on layered system security of the automation system. However, if these system protections are defeated, then it is possible for a bad actor to gain access to an engineering workstation or to a process control network to shutdown the legacy devices or worse permanently disable them by loading counterfeit firmware that could cause loss of control, bad control, or even damage to a device to the point where it cannot be recovered.

SUMMARY

This disclosure relates to a system and method for securing and preventing changes to the configuration and firmware of legacy devices used in an industrial process control and automation system.

In a first embodiment, a method is disclosed comprising setting a lock code in a device index of a device. The method further including executing a monitoring software program that reads the lock code and sets the device in a locked state. An enforcement software program is executed that prevents changes to the configuration and firmware of the device when the device is in the locked state. The first embodiment further includes a method for releasing the device from the locked state comprising, setting an unlock code in the device index of the device and executing the monitoring software program to read the unlock code and set the device in an unlocked state. The enforcement software program allowing changes to the configuration and firmware of the device when the device is in the unlocked state.

In a second embodiment a system is disclosed that comprises a device index associated with a device connected to an industrial process control and automation system and configured to have a lock code entered on the device index. The system includes at least one processing device configured to execute a monitoring software program that reads the lock code and places the device in a locked state and further executes an enforcement software program that prevents configuration and firmware changes to the device. The device is released from the locked state by entering an unlock code in the device index. The monitoring software program reads the unlock code and places the device in an unlocked state that allows the enforcement software program to make configuration and firmware changes to the device.

In a third embodiment a non-transitory computer readable medium containing instructions is disclosed that, when executed by at least one processing device, cause the at least one processing device to read a lock code entered in a device index and place the device in a locked state and to execute an enforcement software program that prevents configuration and firmware changes to the device. The instructions, when executed by the at least one processing device, further cause the at least one processing device to release the device from the locked state when an unlock code is entered in the device index. The monitoring software program reads the unlock code and places the device in an unlocked state allowing the enforcement software program to make configuration and firmware changes to the device.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

This disclosure has the benefit of providing a way to lock down devices used in an industrial process control and automation system such as for example, a controller, a wireless gateway, or an I/O module from any changes to its configuration and firmware. This will prevent a rip and replace of a controller or other automation system device used in the industrial process control and automation system from using counterfeit firmware or from a cyber security attack. This disclosure particularly allows legacy devices used in an industrial process control and automation system to be protected from cyber security attacks with only a software update to the legacy device.

Figure 1:
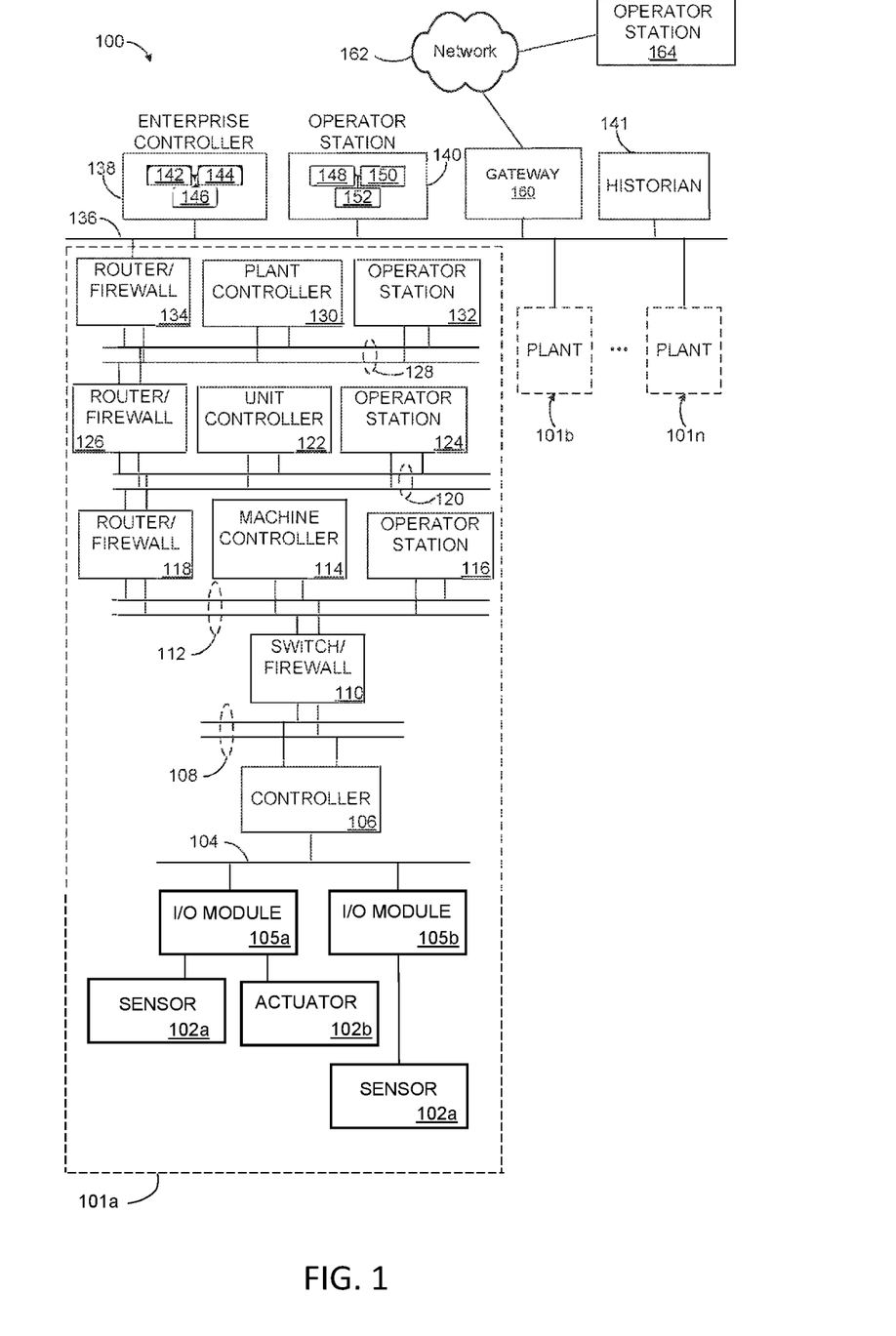
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in the process system 100.

Each of the sensors 102a and actuators 102b are connected to at least one network 104 through a respective I/O module 105a, 105b. The I/O modules providing proper interface connections, such as copper cabling or fiber optic cabling or communication and signal protocols for the type of sensor or actuator being used. The network 104 facilitates interaction with the I/O modules 105a, 105b and sensors 102a and actuators 102b. For example, the network 104 could transport measurement data from the I/O modules 105a, 105b and sensors 102a and provide control signals to the actuators 102b through I/O module 105a and 105b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more I/O modules 105a and 105b and its associated connected sensors 102a and use the measurement data to generate control signals for one or more actuators 102b. Each controller 106 includes any suitable structure for interacting with one or more I/O modules 105a and 105b to control the one or more actuators 102b. Each controller 106 could, for example, represent a proportional-integral-derivative (PID) controller or a multivariable controller, such as a Robust Multivariable Predictive Control Technology (RM-PCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, I/O modules 105a and 105b, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controllers 138 could execute one or more order processing applications, enterprise resource planning (ERP) applications, advanced planning, and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 could include one or more processing devices 142 and one or more memories 144 for storing instructions and data used, generated, or collected by the processing device(s) 142. Each of the controllers 106, 114, 122, 130, 138 could also include at least one network interface 146, such as one or more Ethernet interfaces or wireless transceivers. Also, each of the operator stations 116, 124, 132, 140 could include one or more processing devices 148 and one or more memories 150 for storing instructions and data used, generated, or collected by the processing device(s) 148. Each of the operator stations 116, 124, 132, 140 could also include at least one network interface 152, such as one or more Ethernet interfaces or wireless transceivers.

The system 100 also includes a gateway device 160. The gateway 160 integrates the plants 101a through 101n and the network 136 with a cloud network 162 and an operator station 164. The gateway 160 can include a ONEWIRELESS gateway providing high availability and mesh capability. The gateway 160 may also include Common Embedded Platform for communication protocols as well as redundancy, design, and security features. The gateway 160 includes Intuition and Experion for system connectivity, distributed system architecture, and service oriented architecture. The gateway 160 includes OPC unified architecture (UA) for legacy and future system integration.

A communication stack to the cloud network 162 includes OPC UA and its core services for synchronous and asynchronous data publication, alarms and event publication, history data transfer, blind record, or "BLOB" transfer, and the like. Other cloud protocols can be supported as an alternative to or in addition to OPC UA. The other cloud protocols can have similar services including event streaming to an event hub in the cloud and data access services. The gateway 160 provides secure guard traffic flow bi-directionally to protect both the cloud and the on premise systems and devices (such as the devices within the plant 101a as well as the enterprise controllers 138 and the operator stations 140.

In an embodiment, the networks 136 can represent a cloud network configured to facilitate communication between the gateway 160 and at least one of the enterprise controllers 138, the operator stations 140, the historian 141, or one or more plants 101b-101n via wireless communication.

Although FIG. 1 illustrates one example of an industrial process control and automation system 100, various changes may be made to FIG. 1. For example, a control and automation system could include any number of sensors, actuators, I/O modules, controllers, servers, operator stations, networks, risk managers, and other components. Additionally, for example, the networks 120 and 128 can be a single network and also a non-FTE network with single or dual cables (such as to multiple sections). Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs.

Figure 2:
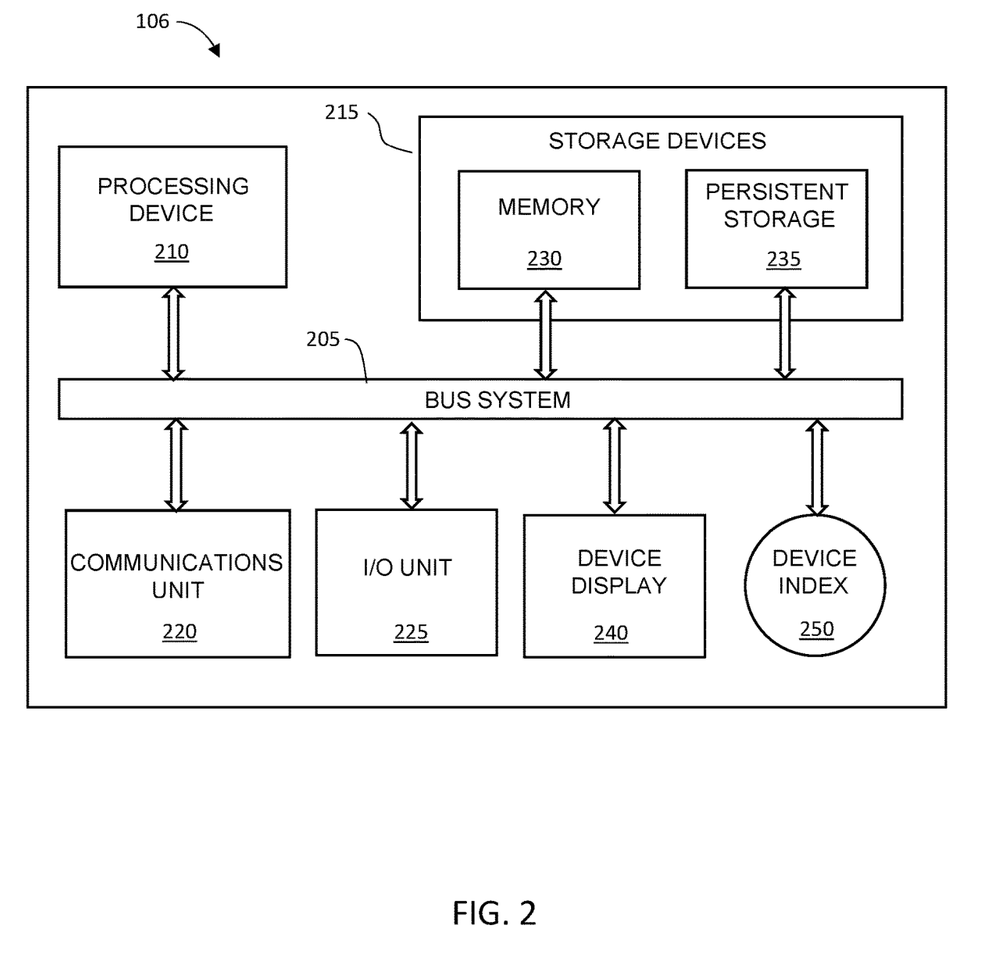
FIG. 2 illustrates details of an example controller according to this disclosure.

FIG. 2 illustrates an example of a controller 106 according to this disclosure. As shown in FIG. 2, the controller 106 includes a bus system 205, which supports communication between at least one processing device 210, at least one storage device 215, at least one communications unit 220, at least one input/output (I/O) unit 225, a device display 240 and a device index 250.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, flash memory, or optical disc.

The communications unit 220 supports communications with other systems or devices. For example, the communications unit 220 could include a network interface card such as for example an Ethernet network interface for communication over the Ethernet network 104 or a wireless transceiver facilitating communications over a wireless network (not shown). The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

The device display 240, may be comprised of a multi-character, multi-line message display, a single alphanumeric character display or various light emitting diodes (LED) that can use colors or blinking effects to provide information to a user. The display device 240 is used to display information and inform a user of the current operating condition and status of controller 106. For the display device 240 of the present disclosure an exemplary single-line, multi-character display will be used to explain the benefits of the present disclosure, however, it will be understood by those skilled in the art that any other display, including those explained above, may be used to provide information to a user at the controller 106.

The device index 250 is a set of electrical switches or other switch type devices that can be physically changed by hand or with the aid of a tool such as for example, a screwdriver. The electrical switches may include a single or multiple dual in-line package (DIP) or rotary dial switches. Other electrical devices used in the industry to switch between functions may also be used, such as for example, shorting jumper pins, manipulating push pins or simply using patch cords that can be physically plugged into sockets to set a code for locking or unlocking the controller 106.

Controllers used in industry particularly those that communicate data using an Ethernet internet protocol (IP) include electrical switches used to enter an internet IP address or portions of the IP address, such as the last octet, of the address to identifying a controller in the Ethernet network. In such controllers it would be an advantage to use the Ethernet IP switches to also enter a lock and unlock code for the controller.

Figure 4:
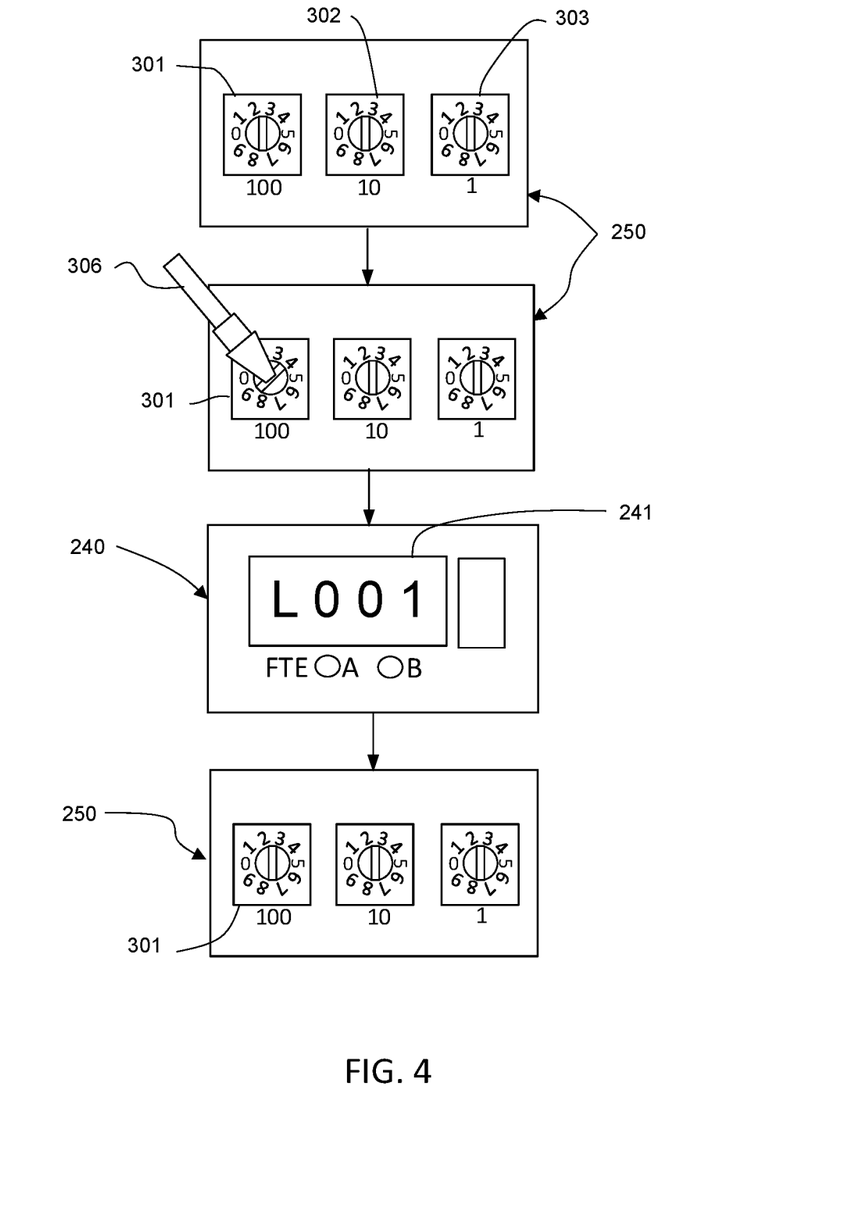
FIG. 4 illustrates the device index and device display used in the method of FIG. 3 according to this disclosure.

For the ease of explaining the benefits of the present disclosure, the device index 250 will be explained using a set of rotary dial switches 300, seen in FIG. 4. Each dial is capable to be physically manipulated to set to a unique number from 0-9 in any particular dial. As can be seen in FIGS. 4, the left most dial 301 represents the most significant digit (MSD) and the right most dial 303 the least significant digit (LSD). The dials are used to complete the IP address for the controller 106 and serve to provide network identification and location addressing of the controller 106 within the Ethernet network 104. Other electrical switches known in the industry and used for changing the state of the controller 106 or setting an IP network address, such as those explained above may be substituted for the rotary dials to comprise the device index 250.

It should be noted that this disclosure will use a controller 106 as an example to explain the invention, it will be understood by those skilled in the art, that other devices used in the system 100, such as for example, the I/O modules 105a, 105b, gateway 160, as well as machine controller 114, unit controller 122 and plant controller 130 that connect to any of the ethernet networks 136, 128, 120, 112, 108 and 104 of the system 100 and that use a device index can be used to practice the invention.

The disclosure provides a controller 106 with a security locked state by setting a lock code using the device index 250. The controller 106 may also be set to an unlocked state by setting an unlock code using the device index 250. A monitoring software program reads the lock or unlock code set in device index 250. An enforcement software program prevents certain controller operations from executing if the controller 106 is in the locked state. Both the monitoring software program and enforcement software program is stored in memory 230 and is executed by the processing device 210. The monitoring software periodically monitors the device index 250 and places the controllers 106 in a locked or unlocked state based on the code set on the dials of the device index 250. The enforcement software program is executed when certain changes to the controller 106 configuration and firmware is being attempted. The enforcement software program checks and determines if the controller 106 is in a locked or an unlocked state. If in the locked state, the enforcement software program prevents any attempted changes to the controller and returning errors messages to an operator's station warning of the attempted change.

Figure 3:
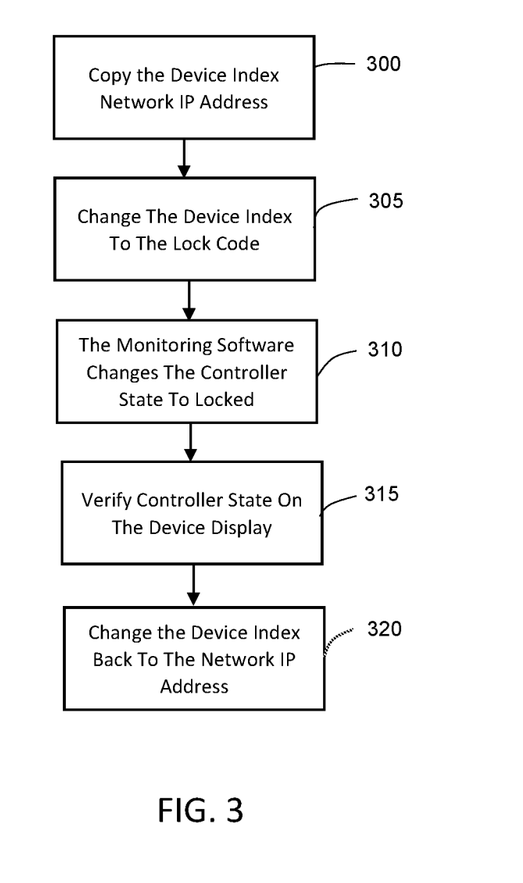
FIG. 3 illustrates a diagram of an example method for setting the controller in a locked state according to this disclosure.

FIG. 3 illustrate the method for setting the controller in a locked state. In step 300, a user, such as plant operator or other authorized user copies or makes note of the numeric settings that are currently set on the dials of the device index 250. Next in step 305 the user changes the device index 250 to the lock code using a tool such as for example, a screwdriver to set the lock code using the dials of the device index 250. As was explained above, other devices can be used to enter a lock or unlock code including for example, DIP switches, jumper pins, push pins or patch cords that can be physically manipulated to set a code for locking or unlocking the controller 106. With a rotary dial, the lock code may be a preset single numeral or a multiple number combination that the monitoring software understands is the code for locking the controller 106. The setting code is entered in any combination on the rotary dials of the device index 250. For example, a numeral from 0-9 can be set using only the MSD dial 301 of the dials 300 or a numeral from 0-9 set in the LSD dial 303 of the device index 250.

It will be appreciated by those skilled in the art that a more complex code may be used to set the lock code, by setting the appropriate numerals in all three dials, such as for example, 123, or 789, etc. In still another more sophisticated method, a combination of three different codes followed by a set time interval between the code settings can be used for setting the lock code. For example, setting 123 in the dials, waiting 10 seconds, setting 234 in the dials, and waiting another 10 seconds and finally 567.

Next in step 310 the monitoring software reads the code set into the dials of the device index 250. If a match is made with the lock code expected by the monitoring software the controllers 106 state is changed to locked. In step 315 the locked state of the controller 106 is visually indicated to the user on the device display 240 confirming that the lock code has been accepted and that the controller 106 is now in the locked state. Finally, in step 320 the user physically changes the dials of the device index 250 back to the network IP address copied from step 300.

FIG. 4 illustrates the method of FIG. 3. The network IP address set in the dials 301, 302, 303 of the device index 250 is copied by the user before being changed by the user. Next the user using a tool such as a screwdriver 306 changes the MSD dial of device index 250 to the number that represents the lock code. In the example of FIG. 4 the screwdriver 306 is used to change the MSD dial 301 to the lock code 4. The device display 240 than verifies to the user that the controller has accepted the lock code by displaying an alphanumeric set of digits in window 241 confirming that the controller 106 is now in a locked state. Finally, the dials of the device index 250 are again set back to the network IP address copied, in the example of this embodiment, resetting the MSD 301 to its original number.

Figure 5:
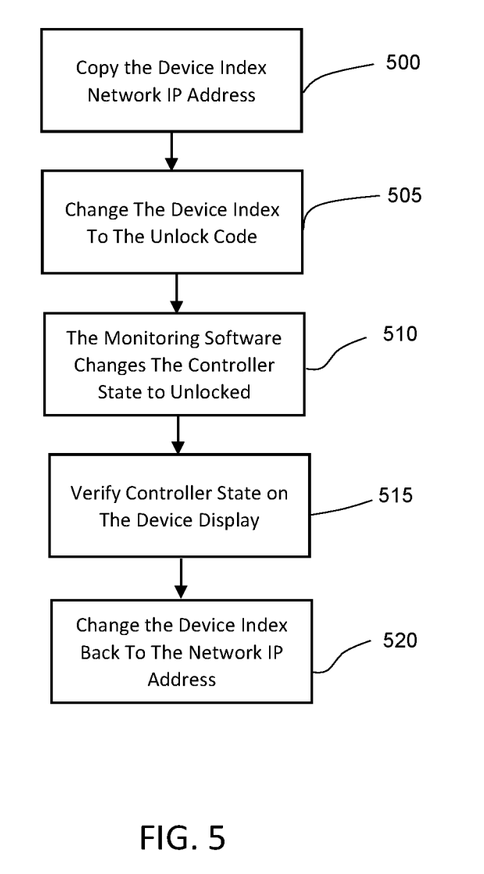
FIG. 5 illustrates a diagram of an example method for setting the controller in an unlocked state according to this disclosure.

FIG. 5 illustrate the method for setting the controller into an unlocked state. The controller may be set to the unlock state to allow configuration and firmware changes to the controller 106 by technical personnel and users that maintain the industrial process control and automation system 100. In step 500, the user copies or makes note of the numeric settings that are currently set on the dials of the device index 250. Next in step 505 the user changes the device index 250 to the unlock code using a tool such as for example, a screwdriver to set the unlock code using the dials of the device index 250. The unlock code may be a preset single numeral or a multiple number combination that the monitoring software understands is the code for unlocking the controller 106, as was explained above for the setting the lock code. Next in step 510 the monitoring software reads the code set into the dials of the device index 250. If a match is made with the unlock code expected by the monitoring software the controllers state is changed to unlocked. In step 515 the unlocked state of the controller 106 is visually indicated to the user on the device display 240 confirming that the unlock code has been accepted and that the controller 106 is now in the locked state. Finally, in step 520 the user physically changes the dials of the device index 250 using the tool back to the network IP address copied from step 500, thereby returning the controllers 106 IP address.

Figure 6:
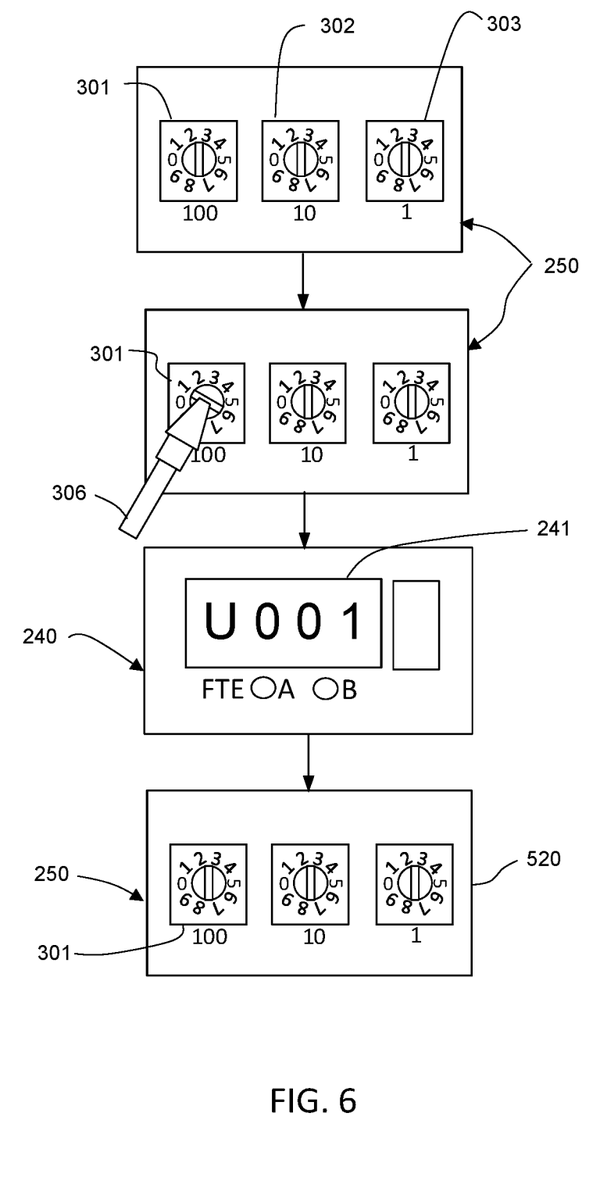
FIG. 6 illustrates the device index and device display used in the method of FIG. 5 according to this disclosure.

FIG. 6 illustrates the steps of FIG. 5. The network IP address set in the dials 301, 302, 303 of the device index 250 is copied by the user before being changed by the user. Next the user using a tool such as a screwdriver 306 changes the MSD dial of device index 250 to the number that represents the unlock code. In the example of FIG. 6 the screwdriver 306 is used to change the MSD dial 301 to the unlock code 6. The device display 240 than verifies to the user that the controller has accepted the unlock code by displaying an alphanumeric set of digits in window 241 confirming that the controller 106 is now in the unlocked state. Finally, the dials of the device index 250 are again set back to the network IP address copied, in the example of this embodiment, resetting the MSD 301 to its original number.

Figure 7:
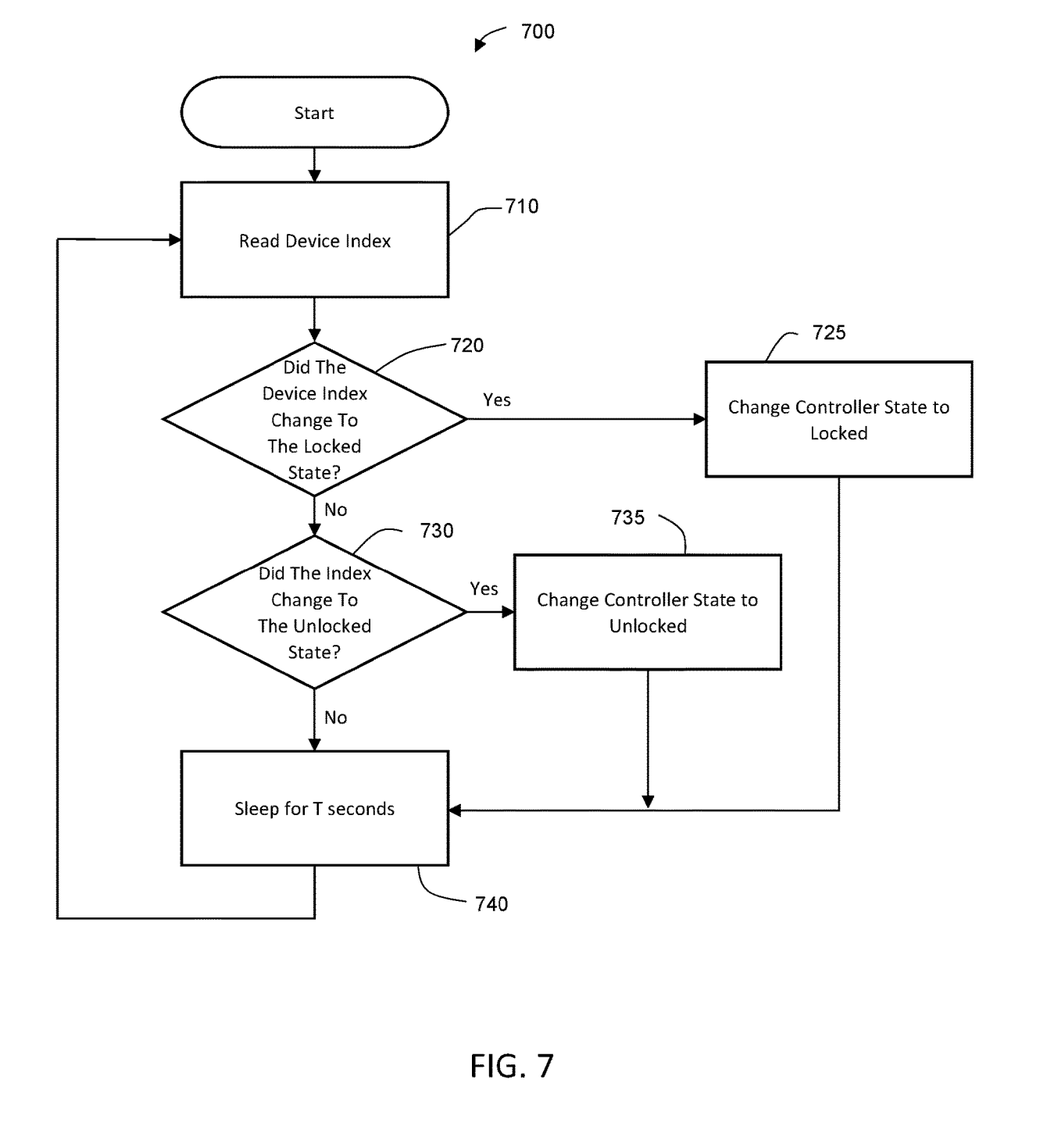
FIG. 7 illustrates a diagram of an example method for monitoring the device index of the controller according to this disclosure.

FIG. 7 illustrates a diagram of an example method 700 of the monitoring software program of the disclosure. The method 700 is run as a periodic task that checks whether the dials of the device index 250 have been physically changed in order to place the controller 106 into the locked or the unlocked state. The method 700 is executed by the processing device 210. The method first reads the value of the dials set in the device index 250 at step 710. Next in step 720 the method checks to see if the device index 250 has been changed to the code for locking the controller 106. If the device index 250 has not changed to the lock code than the method 700 continues and checks if the device index 250 has changed to the unlock code in step 730. If the device index has not changed to the unlock code, then the method 700 goes into a sleep state at step 740 for a preset period of time. After the sleep period terminates the method returns to step 710 to read the device index 250 again.

If a lock code is encountered at step 720 the controller 106 is changed to the locked state in step 725 and the method 700 goes into the sleep state of step 740. After the sleep period 740 terminates the method 700 returns to reading the device index 250 again. The controller 106 remains in the locked state until the device index 250 is changed to the unlocked state. If the method 700 encounters the unlock code in step 730, the controller's state is changed to the unlocked state in step 735 and the method 700 enters into the sleep state for a preset period of time. After the sleep period terminates, the monitoring software returns to 710 to read the device index 250 again. The controller 106 stays in the unlocked state until the device index 250 is changed to enter the lock code.

Upon the locking of the controller 106 any attempts to make changes to the configuration or firmware of the controller 106, such as for example, upgrading the controller firmware, factory reset of the controller, setting the controller to idle, shutting down the controller, changing or deleting the configuration of an application being run by the controller or a change any runtime data such as setpoints would be rejected and not allowed to proceed. A notification would be sent to an operator's station monitoring the controller 106 such as for example operator station 116 of system 100 indicating the rejection of an attempted change to a locked controller.

Figure 8:
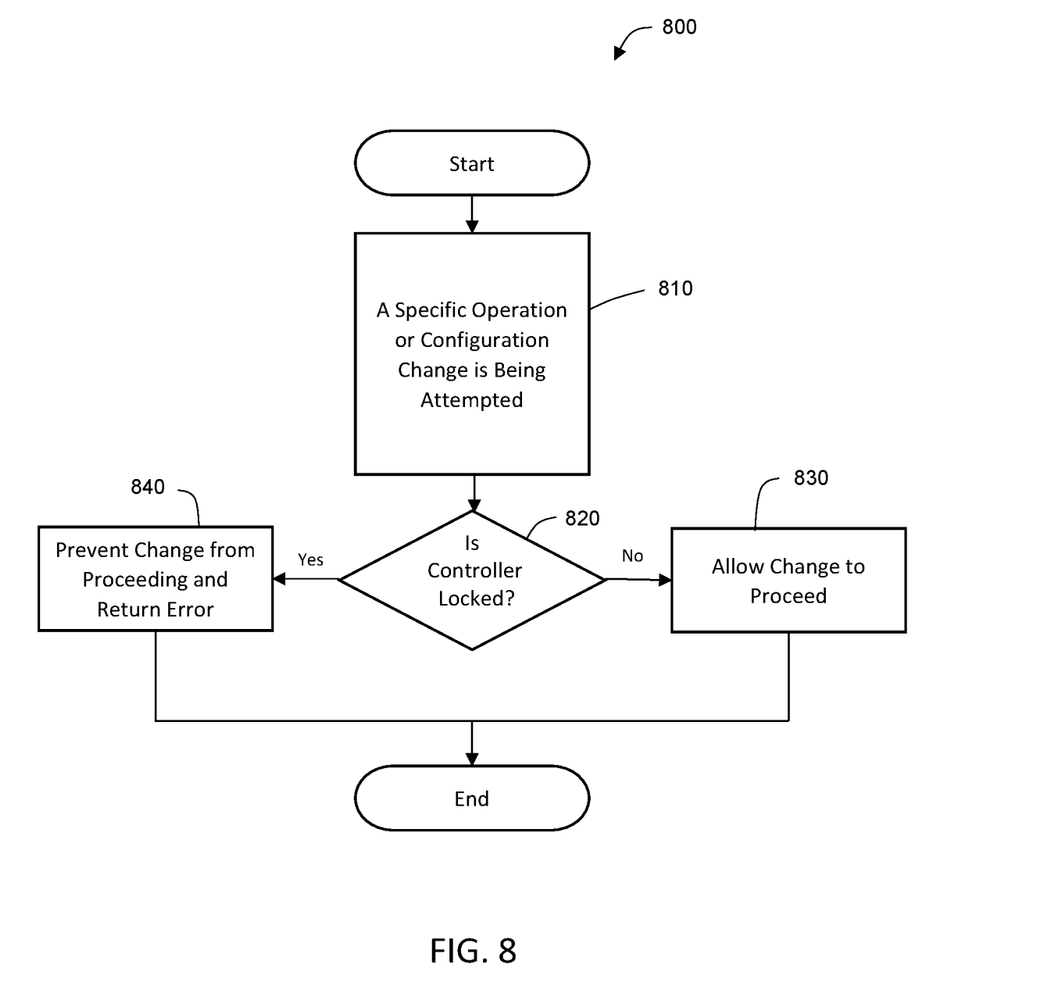
FIG. 8 illustrates a diagram of an example method for enforcing the locked state of the controller according to this disclosure.

FIG. 8 illustrates an example method 800 for the enforcement software program of the disclosure. The method 800 is executed by the processing device 210 and is triggered when a specific attempt to change a specific operation or configuration of the controller 106 is detected as indicated in step 810. Next in step 820 the method 800 checks to see if the controller is in a locked state. If the controller is in the unlocked state, the attempted change to the controller is allowed to proceed by step 830 and method 800 terminates. However, if the method 800 encounters that the controller 106 is in a locked state then any attempted change to the controller 106 is prevented from proceeding at step 840 and an error is returned to operators' station 116, informing the user of the attempted change to the controller 106.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," or "controller" within a claim is understood and intended to refer to structures known to those skilled in the relevant art, as further modified or enhanced by the features of the claims themselves and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for securing a device of an industrial process control and automation system, the method comprising:
   setting a device index associated with the device in a first state;
   executing, by a system, a monitoring software program configured to:
      determine whether the device index has changed to another state other than the first state, and
      determine whether the another state corresponds to at least a locked state or an unlocked state based on reading the device index, wherein the lock state is determined based on the device index representing a lock code, and wherein the unlocked state is determined based on the device index representing an unlock code,
   placing, by the system, the device in a sleep state for a set time period based on at least determining that the another state not corresponding to at least the locked state or the unlocked state;
   in response to expiration of the set time period, determining whether the another state corresponds to at least the locked state or the unlocked state based on reading the device index; and
   executing, by the system, an enforcement software program that prevents configuration and firmware changes to the device in the locked state.

2. The method of claim 1, wherein the method further includes:
   locking the device from the unlocked state on determining the another state corresponds to the locked state, wherein the locking the device comprises:
      setting the lock code in the device index;
      executing the monitoring software program that reads the lock code and places the device in the locked state; and
      executing the enforcement software program that prevents the configuration and firmware changes to the device in the locked state; and
   releasing the device from the locked state on determining the another state corresponds to the unlocked state, wherein the releasing the device comprises:
      setting the unlock code in the device index;

executing the monitoring software program that reads the unlock code and places the device in the unlocked state; and executing the enforcement software program that allows the configuration and firmware changes to the device.

3. The method of claim 2, wherein the device is connected to a network that uses an internet protocol (IP) address to identify the devices connected to the network, wherein the device index enters at least a portion of the IP address at the device.

4. The method of claim 3, further comprising:
reading the lock code set on the device index by the monitoring software program and changing the device to the locked state;
displaying on a display a verification of the locked state of the device; and
changing the device index back to the network IP address.

5. The method of claim 3, further comprising:
reading the unlock code set on the device index by the monitoring software program and changing the device to the unlocked state;
displaying on a display a verification of the unlocked state of the device; and
changing the device index back to the network IP address.

6. The method of claim 2, wherein executing the monitoring software program comprises:
running the monitoring software program to read the device index;
changing the device to the locked state when the lock code is read or to the unlocked state when the unlock code is read;
entering the sleep state for the set period of time in response to the device configured in the locked state or the unlocked state; and
returning to read the device index after the set period of time.

7. The method of claim 2, wherein executing the enforcement software program comprises:
monitoring the device for attempted configuration and firmware changes;
determining by the enforcement software program if the device is in the locked or unlocked state;
allowing the attempted configuration and firmware changes to the device when the enforcement software program determines the device is in the unlocked state; and
preventing the attempted configuration and firmware changes to the device when the enforcement software program determines that the device is in the locked state.

8. The method of claim 7, wherein executing the enforcement software program further comprises:
rejecting the attempted configuration and firmware changes of the device in the locked state; and
sending a notification to an operator's station indicating the rejection of an attempt to change to the device in the locked state.

9. A system comprising:
a device index associated with a device connected to an industrial process control and automation system and configured to have a first state entered on the device index; and
at least one processing device configured to: execute a monitoring software program, wherein the monitoring software program is configured to:

determine whether the device index has changed to another state other than the first state, and
determine whether the another state corresponds to at least a locked state or an unlocked state based on reading the device index, wherein the lock state is determined based on the device index representing a lock code, and wherein the unlocked state is determined based on the device index representing an unlock code
placing, by the system, the device in a sleep state for a set time period based on at least determining that the another state not corresponding to at least the locked state or the unlocked state;
in response to expiration of the set time period, determining whether the another state corresponds to at least the locked state or the unlocked state based on reading the device index; and
execute an enforcement software program that prevents configuration and firmware changes to the device in the locked state.

10. The system of claim 9, wherein the device is locked from the unlocked state on determining the another state corresponds to the locked state, wherein for locking the device, the at least one processing device configured to:
set the lock code in the device index;
execute the monitoring software program that reads the lock code and places the device in the locked state; and
execute the enforcement software program that prevents the configuration and firmware changes to the device; and
wherein the device is released from the locked state by entering the unlock code in the device index, wherein the monitoring software program is configured to:
read the unlock code and place the device in the unlocked state allowing the enforcement software program to make the configuration and firmware changes to the device.

11. The system of claim 10, wherein the device is connected to a network that uses an internet protocol (IP) address to identify the devices connected to the network, wherein the device index is configured to contain at least a portion of the IP address.

12. The system of claim 11, further comprising:
a display connected to the at least one processing device; and
the at least one processing device is configured to:
execute the monitoring software program to read the device index and change the device to the locked state when the lock code is read by the monitoring software program; and
display on the display a verification that the device is in the locked state.

13. The system of claim 11, further comprising:
a display connected to the at least one processing device; and
the at least one processing device is configured to:
execute the monitoring software program to read the device index and change the device to the unlocked state when the unlock code is read by the monitoring software program;
display on the display a verification that the device is in the unlocked state.

14. The system of claim 10, wherein the monitoring software program is executed by the at least one processing device to:
start monitoring of the device index;

change the device to the locked state when the lock code is read or to the unlocked state when the unlock code is read;

enter the sleep state for a set period of time in response to the device configured in the locked state or the unlocked state; and return to monitoring the device index after the set period of time.

15. The system of claim 14, wherein the enforcement software program is executed by the at least one processing device to:

monitor the device for attempted configuration and firmware changes;

determine if the device is in the locked or unlocked state;

allow the configuration and firmware changes to the device when the enforcement software program determines that the device is in the unlocked state; and prevent the configuration and firmware changes to the device when the enforcement software program determines that the device is in the locked state.

16. The system of claim 15, further comprising:

an operator's station connected to a network wherein the enforcement software program is executed by the at least one processing device to:

reject the attempted configuration and firmware changes of the device in the locked state; and send a notification to the operator's station indicating the rejection of an attempt to change the device in the locked state.

17. A non-transitory computer readable medium containing instructions that, when executed by at least one processing device of a system, cause the at least one processing device to:

execute a monitoring software program to read a device index associated with a device, wherein the device index is set in a first state;

determine whether the device index has changed to another state other than the first state, and determine whether the another state corresponds to at least a locked state or an unlocked state based on reading the device index, wherein the lock state is determined based on the device index representing a lock code, and wherein the unlocked state is determined based on the device index representing an unlock code placing, by the system, the device in a sleep state for a set time period based on at least determining that the another state not corresponding to at least the locked state or the unlocked state;

in response to expiration of the set time period, determining whether the another state corresponds to at least the locked state or the unlocked state based on reading the device index; and execute an enforcement software program that prevents configuration and firmware changes to the device in the locked state.

18. The non-transitory computer readable medium of claim 17, wherein the instructions, when executed by the at least one processing device, further cause the at least one processing device to:

lock the device from the unlocked state on determining the another state corresponds to the locked state, wherein the locking the device comprises:

setting the lock code in the device index;

executing the monitoring software program that reads the lock code and places the device in the locked state; and executing the enforcement software program that prevents the configuration and firmware changes to the device; and release the device from the locked state on determining the another state corresponds to the unlocked state, wherein the monitoring software program reads the unlock code on the device index and places the device in the unlocked state allowing the enforcement software program to make the configuration and firmware changes to the device.

19. The non-transitory computer readable medium of claim 18, wherein the instructions, when executed by the at least one processing device, further cause the at least one processing device to:

start monitoring of the device index;

change the device to the locked state when the lock code is read or to the unlocked state when the unlock code is read;

enter the sleep state for the set period of time in response to the device configured in the locked state or the unlocked state; and return to monitoring the device index after the set period of time.

20. The non-transitory computer readable medium of claim 18, wherein the instructions, when executed by the at least one processing device, further cause the at least one processing device to:

monitor the device for attempted configuration and firmware changes;

determine if the device is in the locked state or the unlocked state;

allow the attempted configuration and firmware changes to the device when the enforcement software program determines that the device is in the unlocked state; and prevent the attempted configuration and firmware changes to the device when the enforcement software program determines that the device is in the locked state.

* * * * *